United States Patent
Yamaguchi

(10) Patent No.: US 11,679,550 B2
(45) Date of Patent: Jun. 20, 2023

(54) METHOD OF MANUFACTURING MODELED BODY, METHOD OF MODELING SOLIDIFIED OBJECT, AND MODELED BODY

(71) Applicant: Daichi Yamaguchi, Kanagawa (JP)

(72) Inventor: Daichi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/534,452

(22) Filed: Nov. 23, 2021

(65) Prior Publication Data
US 2022/0168949 A1   Jun. 2, 2022

(30) Foreign Application Priority Data

Nov. 30, 2020 (JP) .............................. JP2020-197954

(51) Int. Cl.
| | | |
|---|---|---|
| *B29C 64/153* | (2017.01) | |
| *B29C 64/165* | (2017.01) | |
| *B33Y 10/00* | (2015.01) | |
| *B33Y 70/00* | (2020.01) | |
| *B33Y 80/00* | (2015.01) | |

(52) U.S. Cl.
CPC .......... *B29C 64/153* (2017.08); *B29C 64/165* (2017.08); *B33Y 10/00* (2014.12); *B33Y 70/00* (2014.12); *B33Y 80/00* (2014.12)

(58) Field of Classification Search
CPC ............................... B29C 64/40; B29C 64/165
See application file for complete search history.

(56) References Cited

U.S. PATENT DOCUMENTS

| | | |
|---|---|---|
| 10,293,595 B2 | 5/2019 | Yamaguchi |
| 2017/0297109 A1 | 10/2017 | Gibson et al. |
| | (Continued) | |

FOREIGN PATENT DOCUMENTS

| | | |
|---|---|---|
| JP | 2018-126912 | 8/2018 |
| JP | 2019-123208 | 7/2019 |
| | (Continued) | |

OTHER PUBLICATIONS

"Real time observation of binder jetting printing process using high-speed X-ray imaging". Sci Rep 9, 2499 (2019) (Year: 2019).*

(Continued)

*Primary Examiner* — Joseph S Del Sole
*Assistant Examiner* — Ariella Machness
(74) *Attorney, Agent, or Firm* — Xsensus LLP

(57) ABSTRACT

A method of manufacturing a modeled body includes: modeling including applying a modeling solution to each layer of powder laid in a layer, to solidify the powder to model a solidified object; sintering the solidified object to obtain a sintered body of the solidified object; and removing a sacrificial body from the sintered body, to obtain a modeled body. At the modeling, the modeling solution is applied to a modeled body area in the solidified object and a border area in the solidified object such that, after the modeling solution is applied, a density of the powder at the border area is smaller than a density of the powder in the modeled body area. The modeled body area corresponds to the modeled body. The border area corresponds to a border between the modeled body and the sacrificial body.

6 Claims, 10 Drawing Sheets

(56) References Cited

U.S. PATENT DOCUMENTS

2019/0210294 A1* 7/2019 Hudelson ................ B22F 10/00
2020/0298476 A1  9/2020 Saito et al.
2021/0245247 A1* 8/2021 Hower ..................... B22F 10/40

FOREIGN PATENT DOCUMENTS

| JP | 2019-522105 | | 8/2019 |
| JP | 2020151993 A | * | 9/2020 |
| WO | 2020/091729 A1 | | 5/2020 |

OTHER PUBLICATIONS

Extended European Search Report dated Apr. 25, 2022 in European Patent Application No. 21208460.2, 12 pages.
Niranjan D. Parab, et al., "Real time observation of binder jetting printing process using high-speed X-ray imaging", Scientific Reports, vol. 9, No. 1, Feb. 21, 2019, XP055752792, 10 pages.
Xinyuan LV, et al., "Binder jetting of ceramics: Powders, binders, printing parameters, equipment, and post-treatment", Ceramics International, vol. 45, No. 10, Apr. 6, 2019, XP085682096, 16 pages.

* cited by examiner

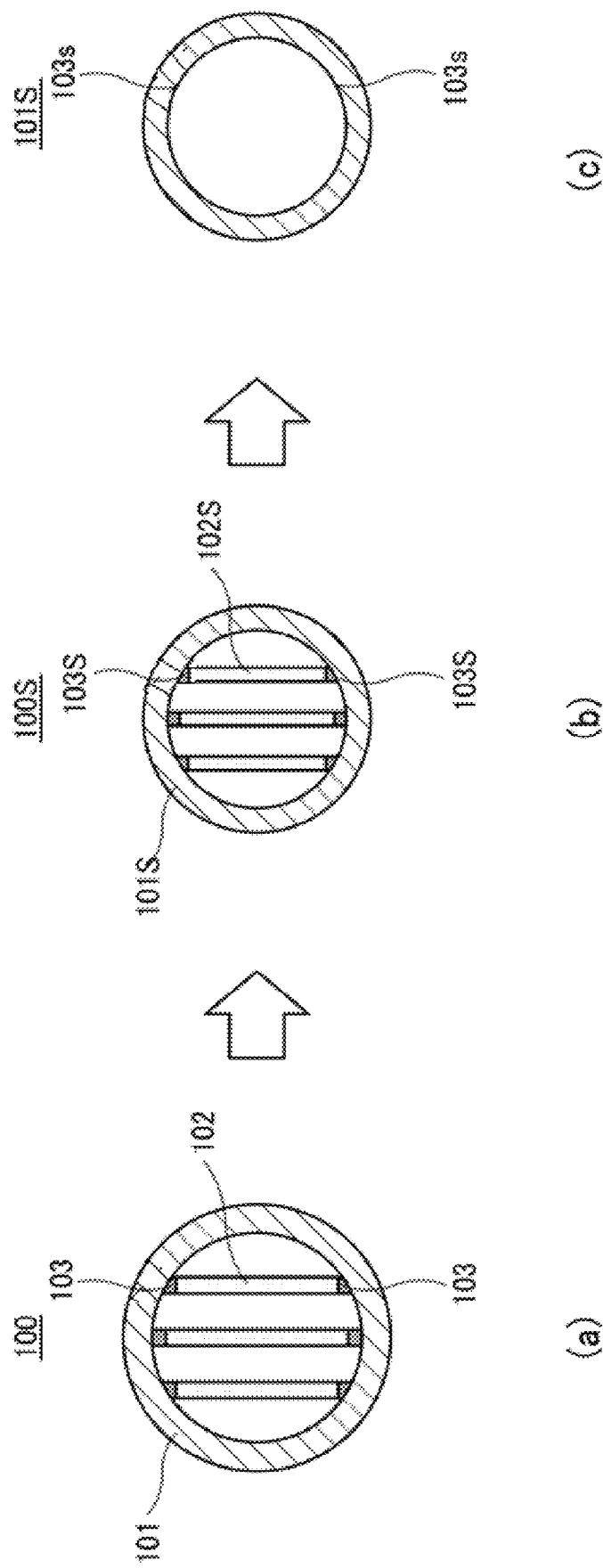

METHOD OF MANUFACTURING MODELED BODY, METHOD OF MODELING SOLIDIFIED OBJECT, AND MODELED BODY

CROSS-REFERENCE TO RELATED APPLICATION

The present application claims priority under 35 U.S.C. § 119 to Japanese Patent Application No. 2020-197954, filed on Nov. 30, 2020. The contents of which are incorporated herein by reference in their entirety.

BACKGROUND OF THE INVENTION

1. Field of the Invention

The disclosure relates to a method of manufacturing a modeled body, a method of modeling a solidified object, and a modeled body.

2. Description of the Related Art

Japanese Unexamined Patent Application Publication No. 2018-126912 describes a 3D modeling apparatus that, prior to stacking of a modeled object layer corresponding to a 3D modeled object, stacks a layer in a thickness up to a given thickness as a sacrificial layer that is separable from the modeled object layer and stacks, between the sacrificial layer and the modeled object layer, a separation layer that is separated integrally with the sacrificial layer from the modeled object layer or a separation layer that is separated integrally with the modeled object layer from the sacrificial layer.

Japanese Translation of PCT International Application Publication No. JP-T 2019-522105 describes a method including fabricating, from a first material, a support structure for an object; fabricating an interface layer adjacent to the support structure; and fabricating a surface of the object from a second material, the surface of the object adjacent to the interface layer and the second material including a powdered material for forming a final part and a binder system including one or more binders, wherein the one or more binders retain a net shape of the object during processing of the object into the final part, wherein processing of the object into the final part includes debinding the net shape to remove at least a portion of the one or more binders and sintering the net shape to join and density the powdered material, and wherein the interface layer resists bonding of the support structure to the object during sintering.

SUMMARY OF THE INVENTION

According to an aspect of the present invention, a method of manufacturing a modeled body includes: modeling including applying a modeling solution to each layer of powder laid in a layer, to solidify the powder to which the modeling solution is applied, to model a solidified object; sintering the solidified object modeled at the modeling to obtain a sintered body of the solidified object; and removing a sacrificial body from the sintered body, to obtain a modeled body in which the sacrificial body is removed from the sintered body. At the modeling, the modeling solution is applied to a modeled body area in the solidified object and a border area in the solidified object such that, after the modeling solution is applied, a density of the powder at the border area is smaller than a density of the powder in the modeled body area. The modeled body area corresponds to the modeled body. The border area corresponds to a border between the modeled body and the sacrificial body.

BRIEF DESCRIPTION OF THE DRAWINGS

FIG. 8 is an illustration of a 3D modeled object and a sintered body of the 3D modeled object according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
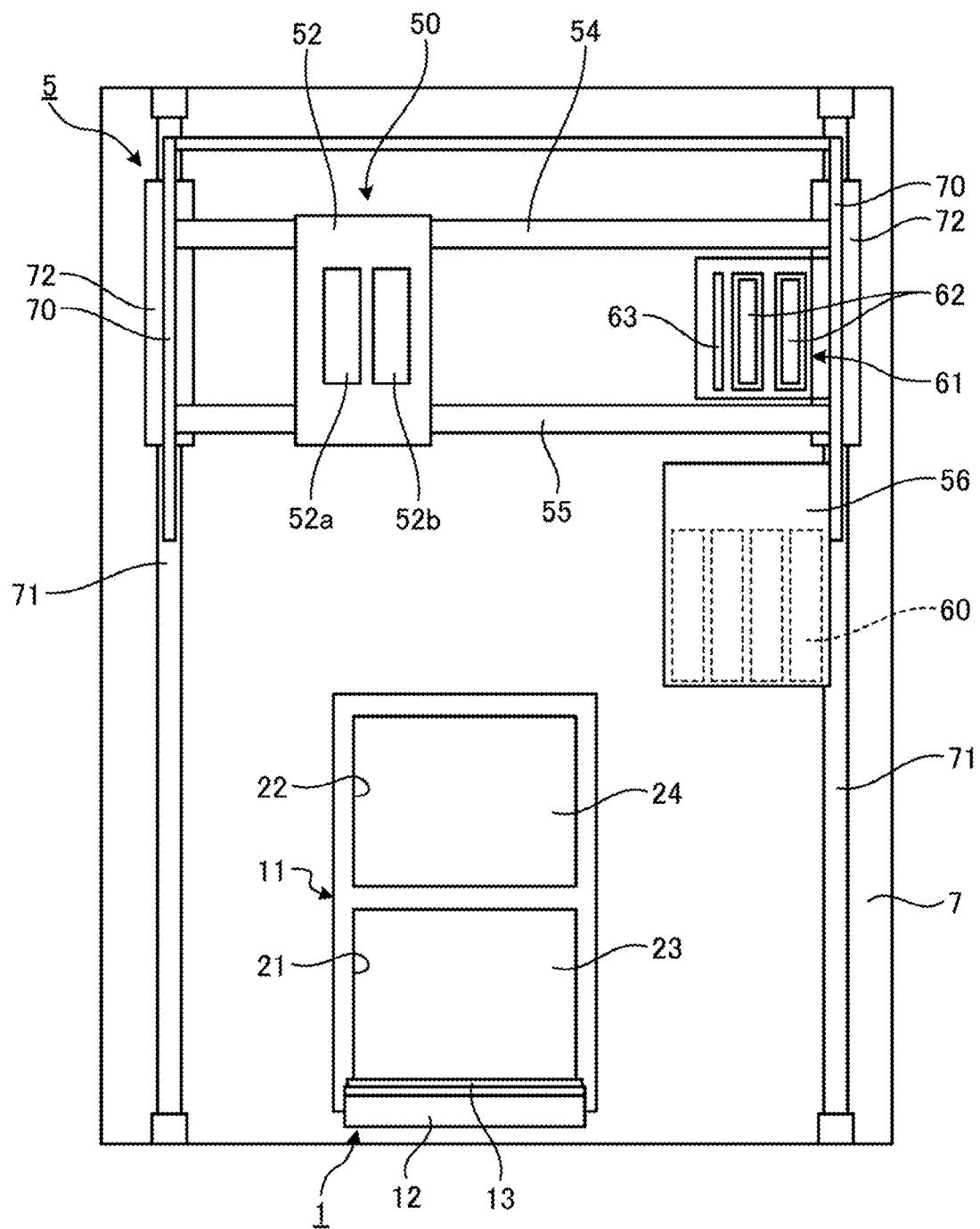
FIG. 1 is a schematic plane view of a 3D modeling apparatus according to an embodiment of the disclosure.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a modeled body with high modeling accuracy.

A 3D modeling apparatus (three-dimensional modeling apparatus) of an embodiment that models a 3D modeled object (three-dimensionally modeled object) by a laminate modeling method will be described as an example. The 3D modeled object includes a solidified object, a sintered body, a sacrificial body, a modeled body, and a green body.

Configuration of 3D Modeling Apparatus

FIG. 1 is a schematic plane view of a 3D modeling apparatus according to the embodiment of the disclosure.

Figure 2:
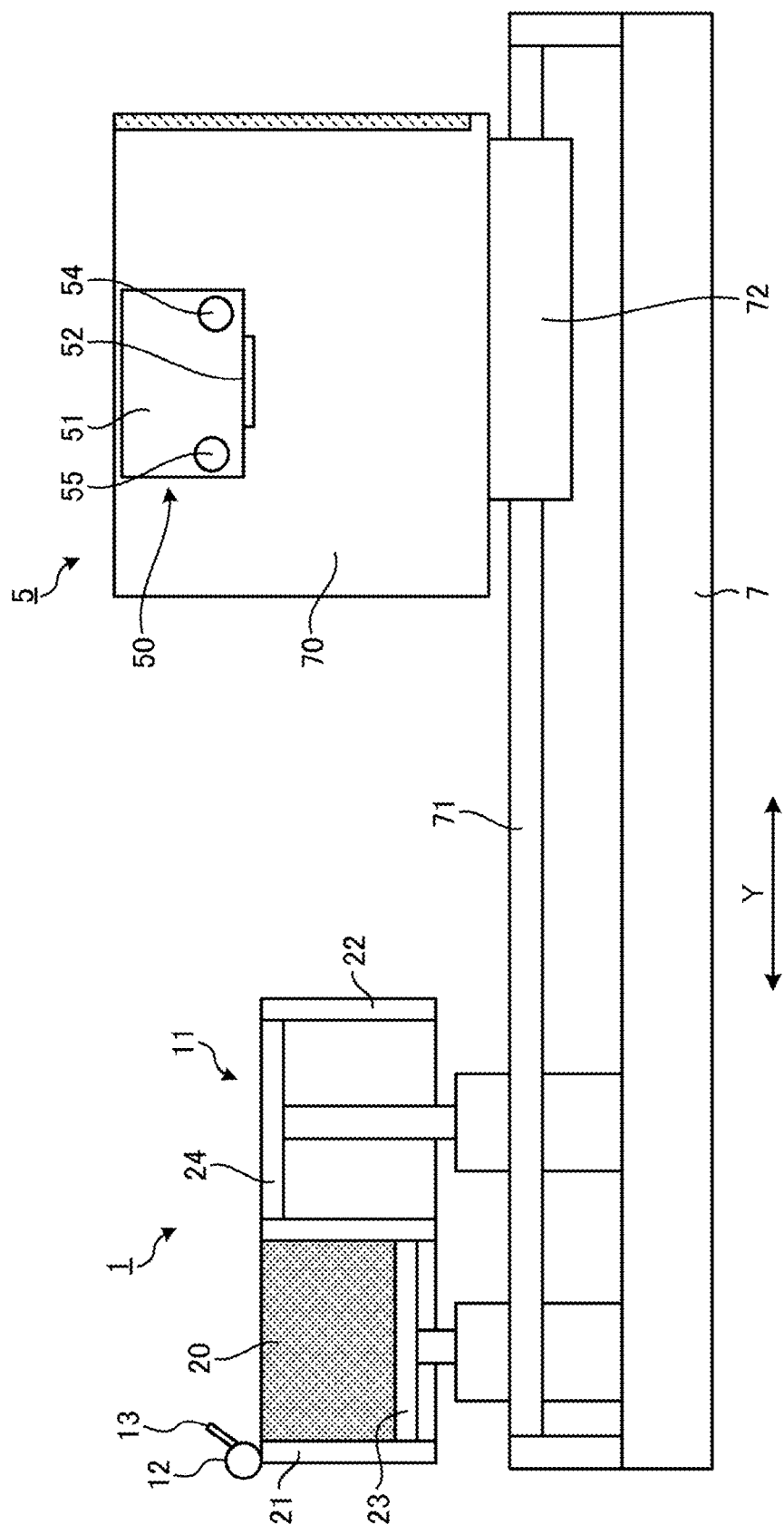
FIG. 2 is a schematic side view of the 3D modeling apparatus according to the embodiment.
Figure 3:
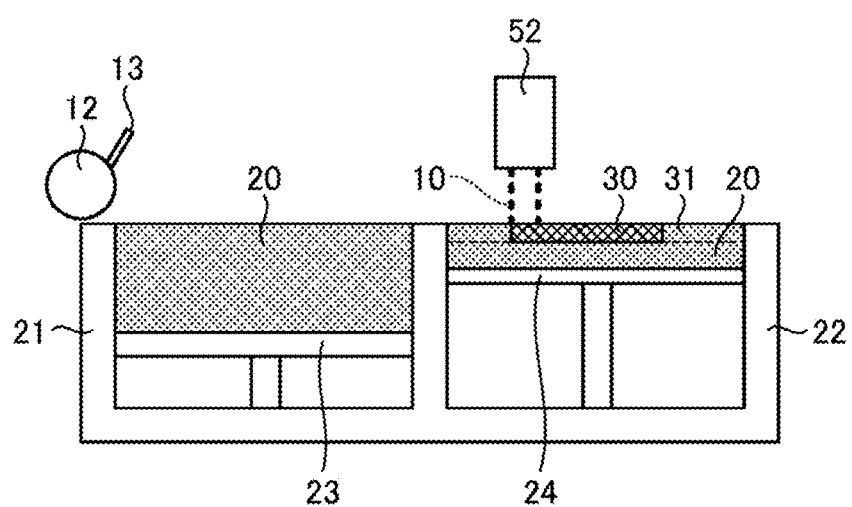
FIG. 3 is a cross-sectional view of a modeling unit that is arranged in the 3D modeling apparatus according to the embodiment.
Figure 4:
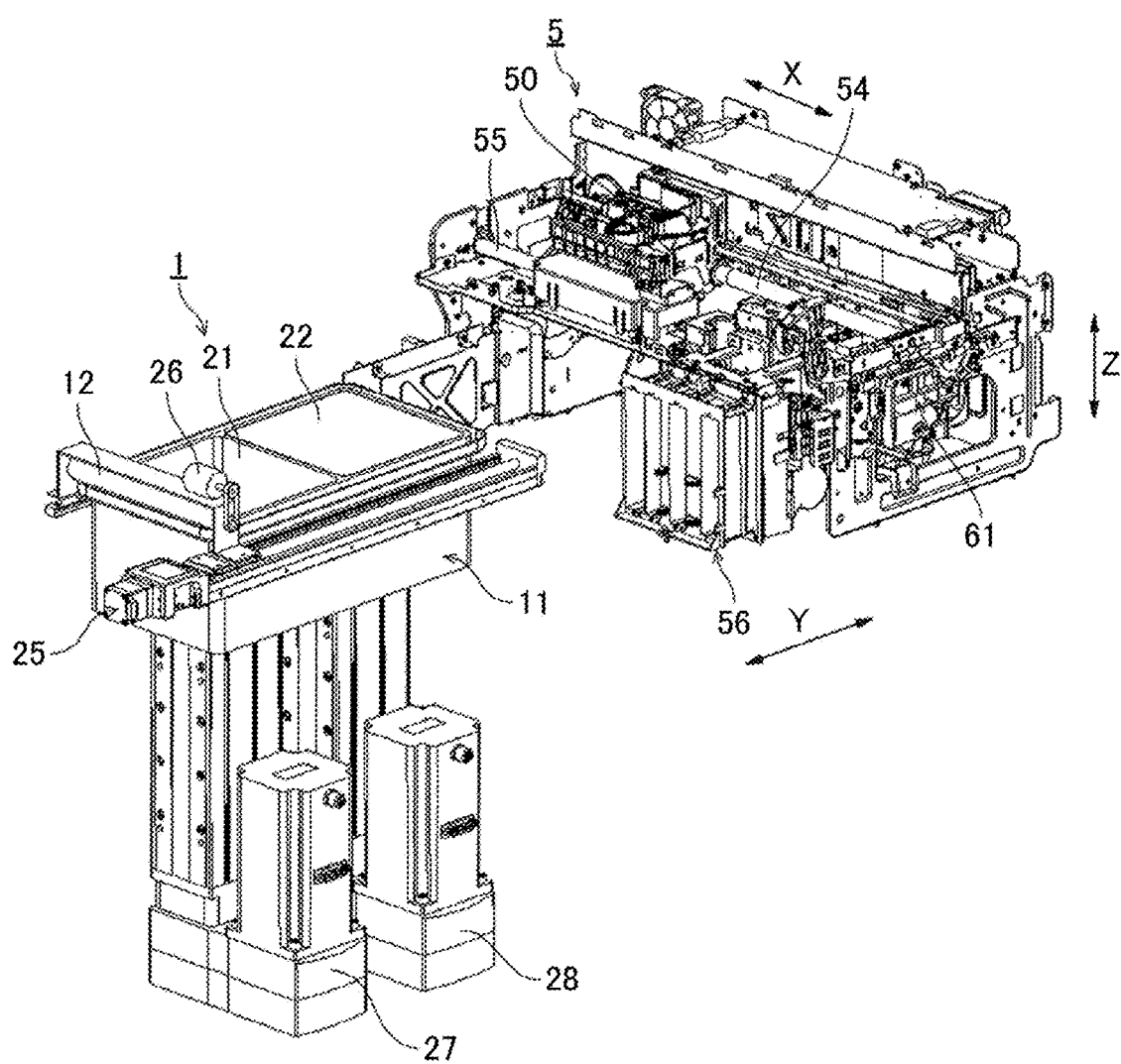
FIG. 4 is a perspective view of a principal part of the 3D modeling apparatus according to the embodiment.
Figure 5:
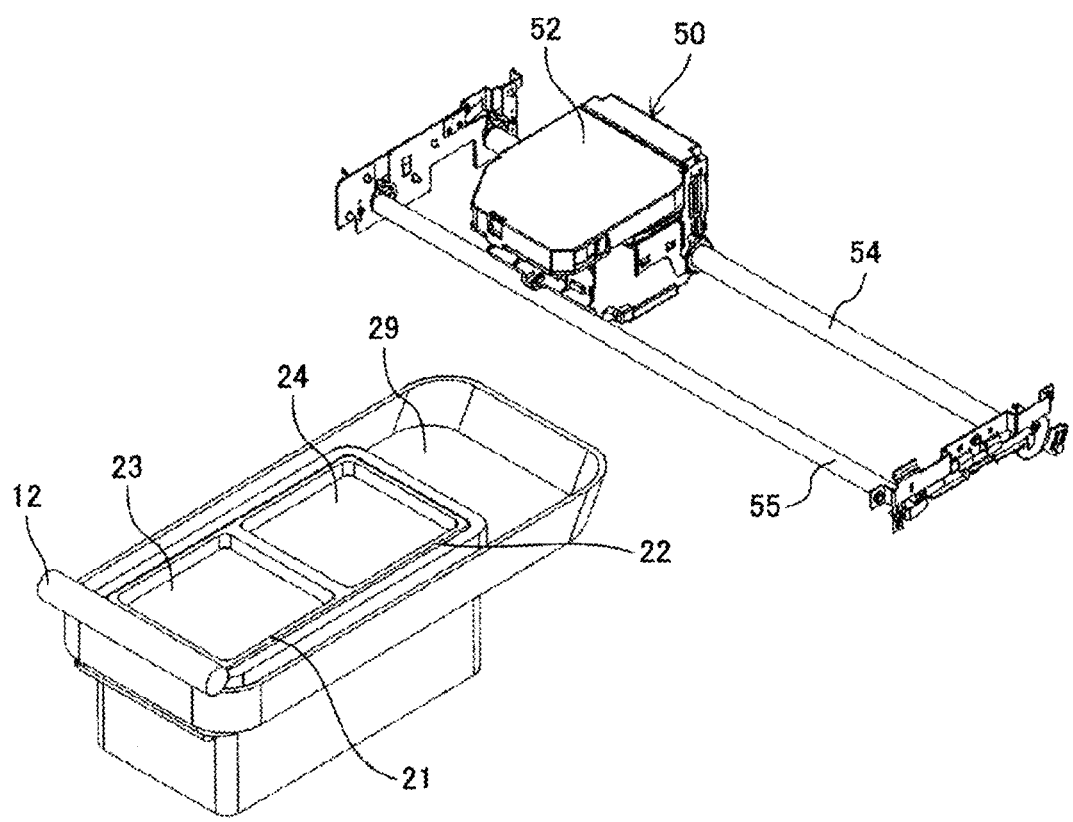
FIG. 5 is a perspective view of the modeling unit that is arranged in the 3D modeling apparatus according to the embodiment.

FIG. 2 is a schematic side view of the 3D modeling apparatus according to the embodiment. FIG. 3 is a cross-sectional view of a modeling unit that is arranged in the 3D modeling apparatus according to the embodiment. FIG. 3 illustrates the state of modeling of a 3D modeled object. FIG. 4 is a perspective view of a principal part of the 3D modeling apparatus according to the embodiment. FIG. 5 is a perspective view of the modeling unit that is arranged in the 3D modeling apparatus according to the embodiment.

The 3D modeling apparatus according to the embodiment includes a modeling unit 1 that forms a modeled layer 30 that is a layered modeled object in which powder (powder: coating powder) is bound. The 3D modeling apparatus includes a modeling unit 5 that models a 3D modeled object by ejecting a modeling solution 10 to a powder layer 31 that is bedded in a layer in the modeling unit 1.

The modeling unit 1 includes a powder vessel 11 and a flattening roller 12 serving as a rotational member that is a flattening member (recoater). Instead of the rotational member, for example, a platy member (blade) may be arranged as the flattening member.

The powder vessel 11 includes a supply vessel 21 that supplies powder 20 and a modeling vessel 22 in which the modeled layers 30 are stacked to form a 3D modeled object. A bottom part of the supply vessel 21 serves as a supply stage 23 and is movable up and down along a vertical direction (height direction). Similarly, a bottom part of the modeling vessel 22 serves as a modeling stage 24 and is movable up and down along the vertical direction (height direction). On the modeling stage 24, a 3D modeled object in which the modeled layers 30 are stacked is modeled.

A motor 27 causes the supply stage 23 to move up and down in a Z-direction (height direction) represented by an arrow in FIG. 4 and, similarly, a motor 28 causes the modeling stage 24 to move up and down in the Z-direction.

The flattening roller 12 is an example of the roller device and supplies, to the modeling vessel 22, the powder 20 that is supplied onto the supply stage 23 of the supply vessel 21 and flattens the powder 20, thereby forming the powder layer 31.

The flattening roller 12 is arranged in a Y direction represented by an arrow in FIG. 4 along a stage surface of the modeling stage 24 (surface on which the powder 20 is laid). A reciprocation mechanism 25 causes the flattening roller 12 to reciprocate relatively to the stage surface. A motor 26 drives the flattening roller 12 to rotate in the counter direction against the travel direction.

On the other hand, the modeling unit 5 includes a liquid ejection unit 50 that selectively ejects multiple modeling solutions 10 to the powder layer 31 on the modeling stage 24. The liquid ejection unit 50 includes a carriage 51 and two (or one or three or more) liquid ejection heads (simply referred to as "heads" below) 52a and 52b that are arranged on the carriage 51.

The carriage 51 is supported movably by guide members 54 and 55. The guide members 54 and 55 and are held by side plates 70 on both sides movably up and down. An X-direction scanning mechanism 550 (see FIG. 6) to be described below causes the carriage 51 to reciprocate in an X-direction that is a main-scanning direction via a main-scanning move mechanism including a motor, a pulley, and a belt.

In each of the two heads 52a and 52b (referred to as "heads" when not particularly distinguished from each other), two nozzle arrays in each of which a plurality of nozzles that ejects a solution are arrayed are arranged. The two nozzle arrays of the head 52a that is one of the heads 52 eject a modeling solution A and a modeling solution B, respectively. The two nozzle arrays of the head 52b that is the other head eject a modeling solution C and a modeling solution D, respectively. The head configuration is not limited to this.

The modeling solutions A, B, C and D may be the same or different solutions containing a cross-linker may be combined and the configuration is not limited.

A plurality of tanks 60 that store the modeling solution A, the modeling solution B, the modeling solution C, and the modeling solution A, respectively, are mounted on a tank mount unit 56 and the modeling solutions are supplied to the heads 52a and 52b via supply tubes, or the like.

A powder post supplier 80 that supplies the powder 20 to at least the area to which the modeling solution 10 is attached when a single layer of the modeled layer 30 is integrally formed in the carriage 51.

On one side in the X-direction, a maintenance mechanism 61 that provides maintenance and recovery of the heads 52 of the liquid ejection unit 50 is arranged. The maintenance mechanism 61 mainly includes caps 62 and a wiper 63. The caps 62 are attached closely to nozzle surfaces (surfaces on which nozzles are formed) of the heads 52 to suck the modeling solution from the nozzles. This is for discharging the powder with which the nozzles are clogged and discharging the modeling solution in high viscosity.

Thereafter, because of meniscus formation of the nozzles (the inside of the nozzles is in a negative-pressure state), the nozzle surfaces are wiped with the wiper 63. When ejection of modeling solutions is not performed, the maintenance mechanism 61 covers the nozzle surfaces of the heads with the caps 62 to prevent the powder from entering the nozzles and prevent the modeling solutions 10 from drying.

The modeling unit 5 includes a slider unit 72 that is movably held by a guide member 71 that is arranged above a base member 7 and the whole modeling unit 5 is able to reciprocate in the Y-direction (sub-scanning direction) orthogonal to the X-direction. A Y-direction scanning mechanism 552 to be described below causes the whole modeling unit 5 to reciprocate in the Y-direction.

The liquid ejection unit 50 is arranged together with the guide members 54 such that the liquid ejection unit 50 is able to move up and down in the Z-direction and a Z-direction moving-up/down mechanism 551 causes the liquid ejection unit 50 to move up and down in the Z-direction.

Detailed Configuration of Modeling Unit

The powder vessel 11 has a box shape and includes two vessels that are the supply vessel 21 and the modeling vessel 22 whose upper surfaces are open. The supply stage 23 is arranged in the supply vessel 21 such that the supply stage 23 is movable up and down and, similarly in the modeling vessel 22, the modeling stage 24 is arranged such that the modeling stage 24 is movable up and down. The relationship between a powder amount a1 that is supplied in the supply vessel 21 and the capacity (powder amount a2) of the modeling vessel 22 satisfies a relationship of "a1×1.01>a2".

The supply stage 23 is arranged such that the side surfaces of the supply stage 23 make contact with the inner surfaces of the supply vessel 21. The modeling stage 24 is arranged such that the side surfaces of the modeling stage 24 make contact with the inner surfaces of the modeling vessel 22. The upper surfaces of the supply stage 23 and the modeling stage 24 are kept horizontal.

Next to the supply vessel 21 and the modeling vessel 22, including the vicinity of the modeling vessel 22, as illustrated in FIG. 5, a surplus powder receiving vessel 29 that is concave with its upper surface being open is arranged. The surplus of the powder 20 among the powder 20 that is transferred and supplied by the flattening roller 12 when forming the powder layer 31 falls in the surplus powder receiving vessel 29. The surplus of the powder 20 having fallen in the surplus powder receiving vessel 29 is brought back to a powder supply device 554 that is to be described below and that supplies the powder 20 to the supply vessel 21.

The powder supply device 554 (see FIG. 6) to be described below is arranged above the supply vessel 21. At the initial operation of modeling or when the amount of the powder in the supply vessel 21 decreases, the powder in the tank configuring the powder supply device 554 is supplied to the supply vessel 21. As a powder delivery method for supplying powder, a screw conveyer system utilizing a screw, an air transport system utilizing air, etc., are exemplified.

The flattening roller 12 transfers and supplies the powder 20 from the supply vessel 21 to the modeling vessel 22 and smooths the surface of the powder 20 to flatten the powder 20, thereby forming the powder layer 31 that is layered powder in a given thickness. The flattening roller 12 is a rod member longer than the inside dimension of the modeling vessel 22 and the supply vessel 21 (in other words, the part to which the powder is supplied or the part in which the powder is stored) and the reciprocation mechanism 25 causes the flattening roller 12 to reciprocate in the Y-direction (sub-scanning direction) along the stage surface.

In the state of being driven to rotate by the motor 26, the flattening roller 12 moves horizontally such that the flattening roller 12 passes over the supply vessel 21 and the modeling vessel 22 from the outside of the supply vessel 21. Accordingly, the powder 20 is transferred and supplied above the modeling vessel 22 and the flattening roller 12 flattens the powder 20 while passing over the modeling vessel 22, so that the powder layer 31 is formed.

As illustrated also in FIG. 2, a powder removal plate 13 for removing the powder 20 that is attached to the flattening roller 12, making contact with the circumferential surface of the flattening roller 12, is arranged. In the state of making contact with the circumferential surface of the flattening roller 12, the powder removal plate 13 moves together with the flattening roller 12 and removes the powder 20 that is attached to the flattening roller 12. The powder removal plate 13 is arranged such that the powder removal plate 13 is in the counter direction when the flattening roller 12 rotates in a rotation direction to perform flattening.

The powder vessel 11 of the modeling unit 1 includes two vessels that are the supply vessel 21 and the modeling vessel 22. Alternatively, a configuration in which the powder vessel 11 includes the modeling vessel 22 only and the powder is supplied from the powder supply device to the modeling vessel 22 and a flattening unit flattens the powder may be employed.

Electric Configuration of 3D Modeling Apparatus

Figure 6:
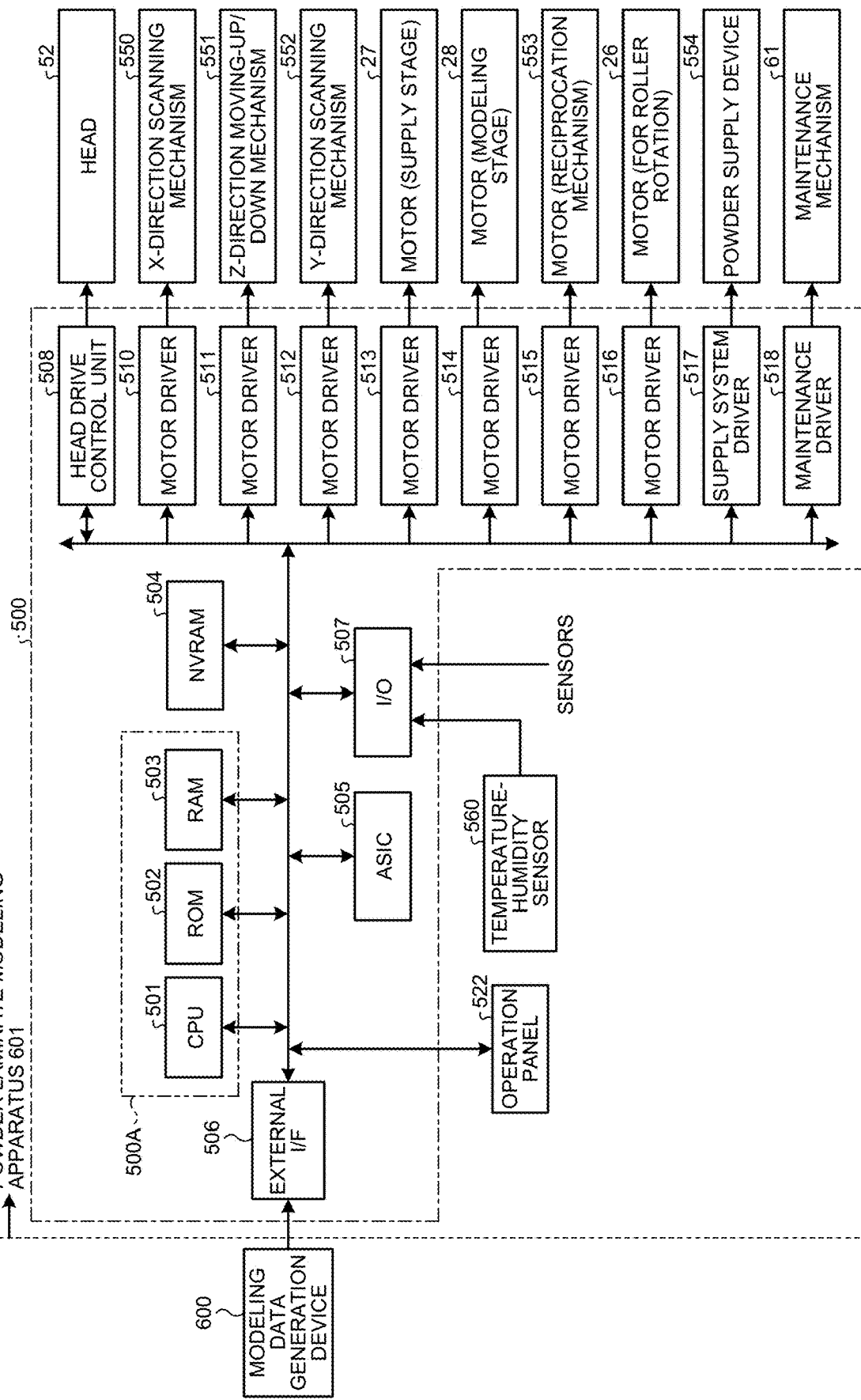
FIG. 6 is a block diagram of the 3D modeling apparatus according to the embodiment.

FIG. 6 represents a block diagram of the 3D modeling apparatus according to the embodiment. In FIG. 6, a control unit 500 includes a main control unit 500A including a CPU 501 that generally controls the 3D modeling apparatus, a ROM 502 that stores programs for causing the CPU 501 to execute 3D modeling control and other fixed data, and a RAM 503 that temporarily stores modeling data, etc.

The control unit 500 includes a non-volatile memory (NVRAM) 504 for storing data even when the power of the apparatus is off. The control unit 500 further includes an ASIC 505 that processes input/output signals for controlling image processing of performing various types of signal processing on image data and further controlling the apparatus generally.

The control unit 500 includes an I/F 506 for transmitting and receiving data and signals that are used to receive modeling data from an external modeling data generation device 600. The modeling data generation device 600 is a device that generates modeling data of layers of a modeled object of a final form into which the modeled object is sliced and an information processing device, such as a personal computer, is usable.

The control unit 500 includes an I/O 507 for loading sensing signals of various sensors. The control unit 500 includes a head drive control unit 508 that controls driving of each head 52 of the liquid ejection unit 50. The control unit 500 includes a motor driver 510 that drives a motor configuring the X-direction scanning mechanism 550 that causes the carriage 51 of the liquid ejection unit 50 to move in the X-direction (main-scanning direction) and a motor driver 512 that drives a motor configuring the Y-direction scanning mechanism 552 that causes the modeling unit 5 to move in the Y-direction (sub-scanning direction).

The control unit 500 includes a motor driver 511 that drives a motor configuring the Z-direction moving-up/down mechanism 551 that causes the carriage 51 of the liquid ejection unit 50 to move (move up/down) in the Z-direction. As for moving up/down in the Z-direction, a configuration in which the entire modeling unit 5 is moved up and down may be employed.

The control unit 500 includes a motor driver 513 that drives the motor 27 that causes the supply stage 23 to move up and down and a motor driver 514 that drives the motor 28 that causes the modeling stage 24 to move up and down. The control unit 500 includes a motor driver 515 that drives a motor 553 of the reciprocation mechanism 25 that causes the flattening roller 12 to move and a motor driver 516 that drives the motor 26 that drives the flattening roller 12 to rotate.

The control unit 500 includes a supply system driver 517 that drives the powder supply device 554 that supplies the powder 20 to the supply vessel 21 and a maintenance driver 518 that drives the maintenance mechanism 61 of the liquid ejection unit 50. Sensing signals of a temperature-humidity sensor 560 that detects a temperature and a humidity as an environment condition of the apparatus, or the like, and sensing signals of other sensors are input to the I/O 507 of the control unit 500. An operation panel 522 for making inputs and displays of information necessary for the apparatus is connected the control unit 500.

The modeling data generation device 600 and the 3D modeling apparatus (powder laminate modeling apparatus) 601 configure a 3D modeling system.

Modeling Operations

Figure 7:
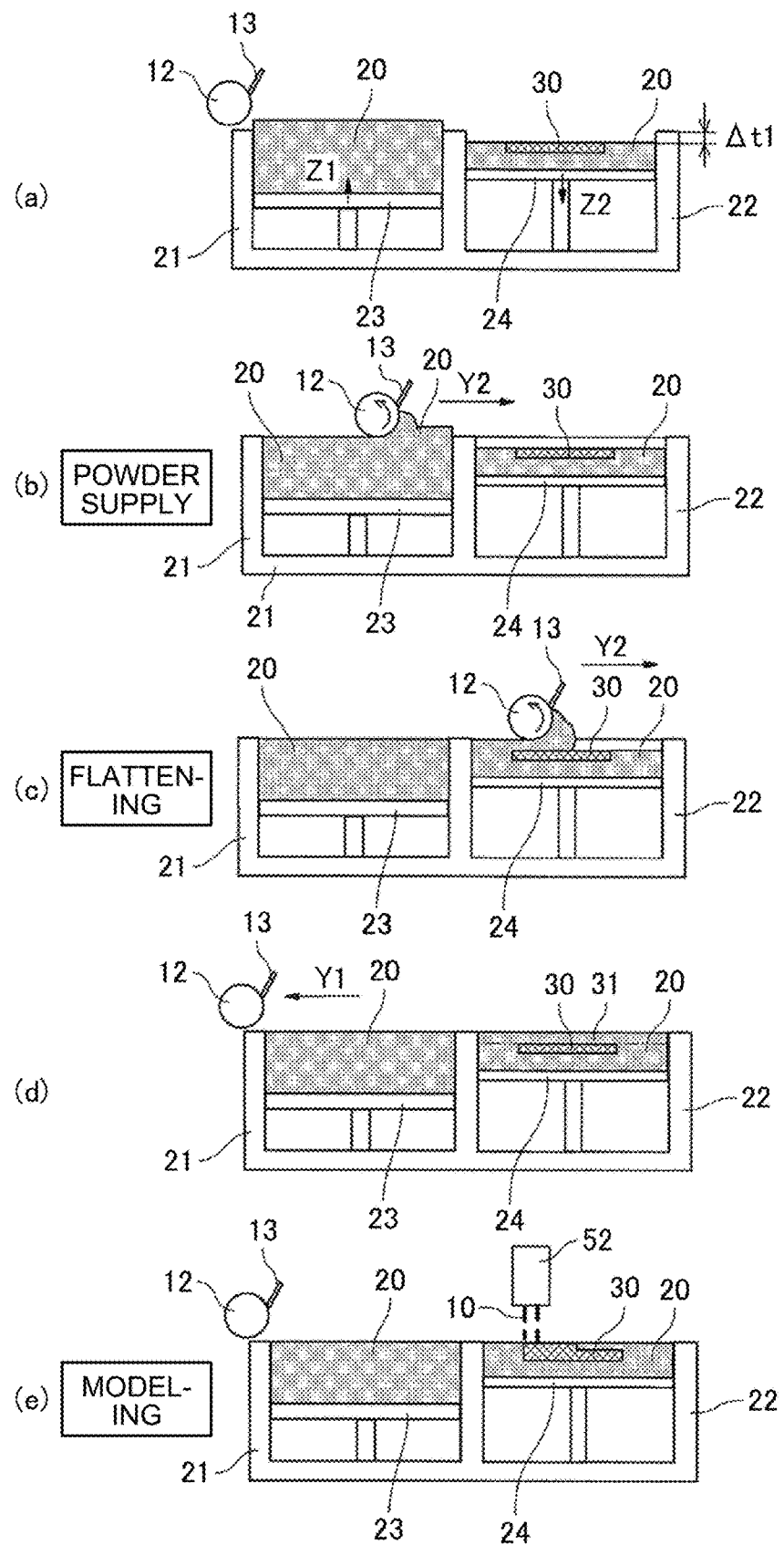
FIG. 7 is a schematic diagram for describing operations of modeling a 3D modeled object performed by the 3D modeling apparatus according to the embodiment.

FIG. 7 is a schematic diagram for describing operations of modeling a 3D modeled object performed by the 3D modeling apparatus according to the embodiment. FIG. 7 illustrates an example of a modeling step according to the embodiment. FIG. 7 illustrates, at (a), a state where a modeled layer 30 of the first layer is formed on the modeling stage 24 of the modeling vessel 22. When the modeled layer 30 of the next layer is formed on the modeled layer 30 in that state, as illustrated at (a) in FIG. 7, the supply stage 23 of the supply vessel 21 is caused to move up in a Z1-direction and the modeling stage 24 of the modeling vessel 22 is caused to move down in a Z2-direction.

A distance by which the modeling stage 24 moves down is set such that the interval between the upper surface of the modeling vessel 22 (powder layer surface) and the bottom of the flattening roller 12 (lower connector) is Δt1. The interval Δt1 corresponds to the thickness of the powder layer 31 to be formed next. For example, the interval Δt1 is around few tens of millimeters to 100 μm.

Next, as illustrated at (b) in FIG. 7, the powder 20 that is positioned above the upper surface level of the supply vessel 21 is moved in a Y2-direction (the side of the modeling vessel 22) by the flattening roller 12 that is driven to rotate in a forwarding direction (the direction of the arrow). Accordingly, the powder 20 is transferred and supplied to the modeling vessel 22 (powder supply).

Furthermore, as illustrated at (c) in FIG. 7, the flattening roller 12 is moved in parallel with the stage surface of the modeling stage 24 of the modeling vessel 22 and, as illustrated at (d) in FIG. 7, the powder layer 31 in the given thickness Δt1 is formed on the modeled layer 30 on the modeling stage 24 (flattening). After forming the powder layer 31, as illustrated at (d) in FIG. 7, the flattening roller 12 is moved in the Y1-direction and is returned to the initial position.

The flattening roller 12 is movable with the distance between the modeling vessel 22 and the upper surface level of the supply vessel 21 kept constant. This makes it possible to, while delivering the powder 20 onto the modeling vessel 22 with the flattening roller 12, form the powder layer 31 in the uniform thickness Δt1 on the modeling vessel 22 or the modeled layer 30 that has been already formed.

Thereafter, as illustrated at (e) in FIG. 7, droplets of the modeling solution 10 are ejected from the heads 52 of the liquid ejection unit 50 and are applied, thereby forming and stacking the modeled layer 30 in the powder layer 31 of the next layer (modeling).

The modeled layer 30 is formed, for example, in a way that the modeling solution 10 that is ejected from the heads 52 is mixed with the powder 20, an adhesive contained in the powder 20 thus dissolves, the dissolved adhesive is bonded, and thus the powder 20 is bound.

Next, the above-described step of forming the powder layer 31 by supplying and flattering powder and the step of ejecting the modeling solution performed by the heads 52 are repeated to form the modeled layer 30 of a new layer. The modeled layer 30 of the new layer and the modeled layer 30 under the new modeled layer are integrated, thereby forming part of a three-dimensionally-shaped modeled object.

Thereafter, the step of forming the powder layer 31 by supplying and flattering powder and the step of ejecting the modeling solution performed by the heads 52 are repeated for a required number of times, thereby completing a three-dimensionally-shaped modeled object (3D modeled object). In other words, the modeling solution 10 is applied to each layer of the powder 20 that is laid in a layer, the powder 20 to which the modeling solution 10 is applied is hardened (solidified) to form the modeled layer 30, and the modeled layers 30 are stacked sequentially to model a 3D modeled object.

Powder Material for 3D Modeling

An example of a powder material (powder) for 3D modeling that is used in the 3D modeling apparatus and the modeling solution will be described next. Note that the powder and the modeling solution are not limited to those described below.

The powder material for 3D modeling includes a base material and a dissolvable organic material that coats, in an average thickness of 5 nm to 1000 nm, the base material, that is dissolvable and cross-linkable because of the effect of the solution containing a cross-linker serving as the modeling solution. In the powder material for 3D modeling, because the dissolvable organic material coating the base material is dissolvable and cross-linkable because of the effect of a solution containing a cross-linker, when the solution containing the cross-linker is applied to the dissolvable organic material, the dissolvable organic material dissolves and cross-links because of the effect of the cross-linker contained in the solution containing the cross-linker.

A thin layer (powder layer) is formed using the above-described powder material for 3D modeling and the solution containing the cross-linker is ejected as the modeling solution 10 onto the powder layer and accordingly the dissolvable organic material having dissolved cross-links in the powder layer and, as a result, the powder layer binds and cures, so that the modeled layer 30 is formed.

The average thickness of the dissolvable organic material coating the base material is 5 nm to 1000 nm and thus, when the dissolvable organic material dissolves, only a minimum necessary amount of the dissolvable organic material is present around the base material, cross-links, and forms a three-dimensional network, so that the powder layer is hardened in accurate dimensions with a preferable strength.

Repeating this operation makes it possible to form a complicated 3D modeled object in accurate dimensions simply and efficiently without losing shape before sintering, or the like.

The dissolvable organic material may be present in the powder and a modeled object may be formed by applying the modeling solution that causes the dissolvable organic material to cross-link and bind or the dissolvable organic material may be mixed with the base material without coating the base material with the dissolvable organic material. The powder 20 may consist of only the base material and the dissolvable organic material may be contained in the modeling solution and be applied to form a modeled object.

Base Material

The base material is not particularly limited as long as the base material is in a form of powder or particles, and it is selectable as appropriate according to the purpose. For example, metal, ceramics, carbon, polymer, etc., are exemplified as the quality of material and, in view of obtaining a 3D modeled object with high strength, metal on which sintering processing can be performed eventually, such as ceramics, is preferable.

The metal is not particularly limited as long as the material contains metal and, for example, a sintering-resistant material, such as aluminum (Al), titanium (Ti) or copper (Cu), magnesium (Mg), vanadium (V), chrome (Cr), manganese (Mn), iron (Fe), cobalt (Co), nickel (Ni), zinc (Zn), yttrium (Y), zirconium (Zr), niobium (Nb), molybdenum (Mo), lead (Pb), silver (Ag), indium (In), tin (Sn), tantalum (Ta), tungsten (W), neodymium (Nd) and furthermore alloys thereof are exemplified. Among them, stainless (SUS) steel, iron (Fe), copper (Cu), silver (Ag), titanium (Ti), aluminum (Al), and alloys thereof are preferable and sintering-resistant materials, such as aluminum (Al), titanium (Ti) or copper, and alloys thereof are more preferable. As the aluminum alloys, for example, AlSi10Mg, AlSi12, AlSi7Mg0.6, AlSi3Mg, AlSi9Cu3, Scalmalloy, ADC12, etc., are exemplified. A single type of them may be used or at least two types of them may be used together.

For example, as ceramics, for example, an oxide, a carbide, a nitride, a hydroxide, etc., are exemplified. As the oxide, for example, a metal oxide, etc., are exemplified. As the metal oxide, for example, silica ($SiO_2$), alumina ($Al_2O_3$), zirconia ($ZrO_2$), titania ($TiO_2$), etc., are exemplified. Note that they are examples only and the ceramics is not limited to them. A single type of them may be used or at least two types of them may be used together.

As carbon, for example, graphite, graphene, carbon nanotube, carbon nanohorn, fullerene, etc., are exemplified.

A single type or the materials may be used or at least two types of them may be used together. For the purpose of increasing affinity with the dissolvable organic material, or the like, known surface (property modification) processing may be performed on the base material.

As the base material, those on the market are usable. As those on the market, for example, Pure Al (from Toyo Aluminium K.K., A1070-30BB), Pure Ti (from OSAKA Titanium technologies Co., Ltd.), SUS316L (from Sanyo Special Steel Co., Ltd., Product Name: PSS316L); AlSi10Mg (from Toyo Aluminium K.K., Si10Mg30BB); $SiO_2$ (from Tokuyama Corporation, Name of product: Excellica SE-15K), $AlO_2$ (from Taimei Chemicals Co Ltd, Product Name: TAIMICRON TM-5D), $ZrO_2$ (from Tosoh Corporation, Product Name: TZ-B53), etc., are exemplified.

Known surface processing (surface property modification processing) may be performed on the base material for the purpose of increasing adhesiveness to resin and increasing the coating property.

The volume mean diameter of the base material is not particularly limited and it is selectable as appropriate according to the purpose. For example, a volume mean diameter between 2 μm and 80 μm inclusive is preferable and a volume mean diameter between 8 μm and 50 μm inclusive is more preferable.

When the base material has a volume mean diameter of 2 μm or larger, it is possible to prevent the effect of particle coagulation from increasing, easily perform resin coating on the base material, prevent the yield from decreasing, prevent the efficiency of manufacturing a modeled object from decreasing, and prevent easiness in dealing with and handling the base material from decreasing. With a volume mean diameter of 80 μm or smaller, when a film layer is formed using the powder material for 3D modeling, a filling factor of the powder material for 3D modeling in the film layer increases and thus a gap tends not to occur in the resultant 3D modeled object.

The particle size distribution of the base material is not particularly limited and a particle size distribution is selectable as appropriate according to the purpose and it is preferable that the particle size distribution be sharp.

As for the outer shape, surface area, degree of circularity, fluidity, and wettability, etc., of the base material, they are selectable as appropriate according to the purpose.

The base material can be manufactured by a conventional known method. As a method of manufacturing a base material in a form of powder or particles, for example, a grinding method of applying pressure, shock, friction, or the like, to a solid to segment the solid, an atomizing method of obtaining suddenly chilled powder by spraying molten metal, a deposition method of depositing components that are dissolved into liquid, a gas phase reaction method of vaporization for crystallization, etc., are exemplified.

The base material is not limited to the manufacturing method and, as a more preferable method, for example, the atomizing method is exemplified from the aspect that the a spherical shape is obtained and the particle diameter varies little. As the atomizing method, water atomizing method, gas atomizing method, a centrifugal atomizing method, and a plasma atomizing method are exemplified and any one of them is used preferably.

Dissolvable Organic Material

As the dissolvable organic material, one that dissolves into the modeling solution and has properties enabling cross-link because of the effect of the cross-linker is usable. In other words, the dissolvable organic material is not particularly limited as long as the dissolvable organic material is dissolvable into the modeling solution and is capable of cross-link, and the dissolvable organic material is selectable according to the purpose. Resin serving as the dissolvable organic material will be described below.

As the resin, one that has reactive functional groups, that dissolves into a solution for hardened object formation, and that reacts with a cross-linker contained in the solution for hardened object formation, thereby enabling formation of a cross-link structure by covalent bonds, may be used. Resin with dissolvability (dissolvable) means that, for example, when 1 g of the resin is mixed into 100 g of a solvent constituting the solution for hardened object formation at 30° C. and the mixture is stirred, 90 percentage by mass or more of the resin dissolves.

It is preferable that the resin have low reactiveness to metal powder with high reactivity (highly reactive metal) serving as the base material, the resin before curing can be dissolved (dissolvable) into the organic solvent, and the resin having cured (having cross-linked) be not dissolved (indissolvable) into the organic solvent. Particularly, it is preferable that the resin be less dissolvable into water and is dissolvable into the organic solvent.

When the resin has low reactiveness to metal powder with high reactivity (reactive metal) serving as the base material, the resin before being applied with the solution for hardened object formation can be dissolved (dissolvable) into the organic solvent, and the resin after being applied with the solution for hardened object formation (after cross-link) is not dissolved (indissolvable) into the organic solvent, the resin is usable even when the base material is a highly reactive metal, that is, a water-reactive material (for example, aluminum or titanium) and it is possible to prevent the manufactured 3D modeled object from collapsing even when being immersed in a solvent solution.

The reactive functional groups are not particularly limited as long as the reactive functional groups react with the cross-linker and enables formation of covalent bonds and the reactive functional groups are selectable as appropriate according to the purpose and, for example, a hydroxy group, a carboxyl group, an amide group, a phosphoric acid group, a thiol group, an acetoacetyl group, ether bond, etc., are exemplified.

Among them, in view of improvement in adherence to the base material and reactiveness with the cross-linker, it is preferable that the resin have hydroxy groups. Furthermore, it is preferable that 95 percentage by mass of the resin dissolves thermally when the resin is singularly heated at 450° C. so as not to cause sintering inhibition because of residue of the resin in the 3D modeled object in sintering.

As the resin, for example, polyvinyl acetal (glass transition temperature: 107° C.), polyvinyl butyral (glass transition temperature: 67° C.), polyacrylic polyol (glass transition temperature: 80° C.), polyester polyol (glass transition temperature: 133° C.), polybutadiene polyol (glass transition temperature: −17° C.), ethyl cellulose (glass transition temperature: 145° C.), nitrocellulose (glass transition temperature: 50° C.), etc., are exemplified. In addition, a partially saponified material of vinyl acetate heteropolymer (such as vinyl chloride-vinyl acetate or ethylene-vinyl acetate), polyether polyol, phenol polyol, etc., are exemplified. A single type of them may be used or at least two types of them may be used.

Resin that is not cross-linked will be described next below. The resin is not particularly limited as long as dissolvableness into water is 0.5 (g/100 g-H2O) or smaller (dissolves in a range of 0.5 g or smaller into 100 g of water at 25° C.) and, for example, acrylic resin, acrylic polyol, polyester, epoxy, polyol, urethane, polyether, polyvinyl butyral, polyvinyl acetal, polyvinyl chloride, vinyl acetate, paraffins, olefins, ethyl cellulose, etc., are exemplified.

The resin is not particularly limited as long as the resin shows dissolvability in an organic solvent contained in the ink and the resin may be homopolymer or heteropolymer or may be modified, or known functional groups may be introduced. A single type of them may be used or at least two of them may be used together.

A weight-average molecular weight of non-aqueous dispersion resin is preferably 150,000 or smaller and is more preferably between 20,000 and 100,000 inclusive and it is preferable that the non-aqueous dispersion resin have a weight-average molecular weight of 100,000 or smaller and be solid at room temperature.

The non-aqueous dispersion resin may be one on the market. As the non-aqueous dispersion resin on the market, for example, polyvinyl butyral (from SEKISUI CHEMICAL CO., LTD., BM-5), a heteropolymer of vinyl acetate and vinyl chloride (from Nissin Chemical Industry Co., Ltd., SOLBIN A), polyester polyol (from DIC Corporation: POLYLITE OD-X-668, or the like, from ADEKA Corporation: ADEKA NEWACE YG-108, or the like), polybutadiene polyol (from Nippon Soda Co., Ltd.: GQ-1000, or the like), polyvinyl butyral and polyvinyl acetal (from SEKISUI CHEMICAL CO., LTD.: S-LEC BM-2, KS-1, or the like, from Kuraray Co., Ltd.: MOWITAL B20H, or the like), polyacrylic polyol (from DIC Corporation: ACRYDIC WFU-580, or the like), ethyl cellulose (from NISSHIN & CO., LTD.: ETHOCEL), etc., are exemplified.

Solutions Containing Cross-Linker

The solution containing a cross-linker serving as the modeling solution is not particularly limited as long as the solution contains a cross-linker in a liquid medium and the solution containing a cross-linker is selectable as appropriate according to the purpose. Note that the solution containing a cross-linker may contain, in addition to the liquid medium and the cross linker, other components that are selected appropriately as required.

Other components are selectable as appropriate in consideration of the type of the unit that applies the solution containing a cross-linker and conditions, such as the frequency of use or the volume. For example, when the solution containing a cross-linker is applied by a liquid ejection method, it is possible to select the solution in consideration of the effect of clogging the nozzles of the liquid ejection heads. A hardener serving as the solution containing a cross-linker will be described below.

Hardener

The hardener contains a hardening agent capable of formation of covalent bonds with the reactive functional groups, preferably contains an organic solvent, and further contains other components as required.

Hardening Agent

The hardening agent enables formation of covalent bonds with the reactive functional group. The hardening agent forms covalent bonds with the reactive functional groups of resin and thus forms a cross-link structure, thereby further increasing the strength of a resultant 3D modeled object and increasing solvent resistance. In the disclosure, the "hardening agent" is equivalent to the "cross-linker".

The hardener is a compound with at least two isocyanate groups at molecular ends. As the compound with at least two isocyanate groups at molecular ends, for example, a diisocyanate, a polyisocyanate, etc., are exemplified.

As the diisocyanate, for example, a diisocyanate, such as an aromatic diisocyanate like a tolylene diisocyanate (TDI), a diphenylmethane diisocyanate (MDI), a tolidine diisocyanate (TODI), a naphthalene diisocyanate (NDI), a xylylene diisocyanate (XDI) or a paraphenylene diisocyanate; an aliphatic isocyanate like an isophorone diisocyanate (IPDI), a 1,3-bis (isocyanatomethyl) cyclohexane (H6XDI), a hexamethylene diisocyanate (HDI) or a pentamethylene diisocyanate (PDI); a lysine diisocyanate (LDI), or a tetramethylxylene diisocyanate (TMXDI), or an adduct of the diisocyanate and a diol compound are exemplified.

As the polyisocyanate, for example, an adduct of the diisocyanate and a triol, a biuret, an allophanate, and an isocyanurate are exemplified. The compound with at least two isocyanate groups at molecular ends may be one on the market and, as the compound on the market, TAKENATE D110N, D120N, D140N, D160N, D165N, D178NL, D103H or D204EA-1 and STABiO D370N or D376N from Mitsui Chemicals, Inc., and DURANATE D101, D201 or A201H from Asahi Kasei Corp., are exemplified. One type of them may be used or at least two types of them may be used together.

The content of the hardening agent in the total hardener is not particularly limited and the content is selectable according to the purpose. The content of the hardening agent is preferably at least 1.0% by mass, is more preferably at least 5.0% by mass, and is further preferably between 5.0% by mass and 50% by mass inclusive. When the content of the hardening agent in the total hardener is between 1.0% by mass and 50% by mass inclusive, it is possible to prevent the strength of the resultant 3D modeled object from being insufficient.

First Organic Solvent

The first organic solvent is a liquid component for keeping the hardener being a liquid at room temperature. The first organic solvent preferably has a saturated vapor pressure of 2,000 Pa or lower at 25° C. and is more preferably indissolvable or dissolvable little into water. Being indissolvable or dissolvable little means that the dissolvability to water is 80 g/L or lower.

The first organic solvent with a saturated vapor pressure of 2,000 Pa or lower at 25° C. makes it possible to inhibit the nozzles from drying when the apparatus is not in operation (standby) and increase ejection stability.

The organic solvent preferably enables the resin contained in the powder material for 3D modeling to dissolve by 1% by mass or more and more preferably enables the resin to dissolve by 5% by mass or more at 25° C. The first organic solvent enabling the resin contained in the powder material for 3D modeling to dissolve by 1% by mass or more makes it possible to increase the strength of the 3D modeled object before being sintering.

As the first organic solvent, for example, an aliphatic hydrocarbon or an aromatic hydrocarbon, such as n-octane (boiling point: 125.6° C., saturated vapor pressure: 1.86 kPa (25° C.)), m-xylene (boiling point: 139° C., saturated vapor pressure: 0.8 kPa (20° C.)) or solvent naphtha (boiling point: 150° C., saturated vapor pressure: 0.1 kPa to 1.4 kPa (20° C.)); a ketone, such as di-isobutyl ketone (boiling point: 168° C., saturated vapor pressure: 0.23 kPa (20° C.)), 3-heptanone (boiling point: 146° C. to 149° C., saturated vapor pressure: 1.4 kPa (25° C.)), 2-octanone (boiling point: 172.5° C., saturated vapor pressure: 1.35 kPa (25° C.)), acetylacetone (boiling point: 138° C., saturated vapor pressure: 0.93 kPa); an ester, such as a butyl acetate (boiling point: 126° C., saturated vapor pressure: 1.53 kPa (25° C.)), amyl acetate (boiling point: 142° C., saturated vapor pressure: 0.747 kPa (25° C.)), n-hexyl acetate (boiling point: 168° C. to 170° C., saturated vapor pressure: 0.5 kPa (20° C.)), n-octyl acetate (boiling point: 210° C.), ethyl butyrate (boiling point: 121° C., saturated vapor pressure: 0.17 kPa (20° C.)), ethyl valerate (boiling point: 145° C.), ethyl caprylate (boiling point: 208° C., saturated vapor pressure: 0.2 kPa (20° C.)), ethyl octanoate (boiling point: 208° C., saturated vapor pressure: 0.003 Pa (25° C.)), ethyl acetoacetate (boiling point: 181° C., saturated vapor pressure: 0.1 kPa (20° C.)), ethyl 3-ethoxypropionate (boiling point: 166° C., saturated vapor pressure: 0.2 kPa (25° C.)), diethyl oxalate (boiling point: 182° C. to 186° C., saturated vapor pressure: 0.027 kPa (20° C.)), diethyl malonate (boiling point: 199° C., saturated vapor pressure: 0.13 kPa (40° C.)), diethyl succinate (boiling point: 215° C. to 217° C., saturated vapor pressure: 0.133 kPa (55° C.)), diethyl adipate (boiling point: 245° C.), Bis(2-ethylhexyl) maleate (boiling point: 173° C.), triacetin (boiling point: 258° C., saturated vapor pressure: 0.00033 Pa (25° C.)), tributyrin (boiling point: 190° C.), propylene glycol monoethyl ether acetate (boiling point: 146° C., saturated vapor pressure: 0.5 kPa) or ethylene glycol monobutyl ether acetate (boiling point: 192° C., saturated vapor pressure: 0.031 kPa (25° C.)); and an ether, such as dibutyl ether (boiling point: 142° C., saturated vapor pressure: 0.64 kPa (25° C.)), 1,2-dimethoxybenzene (boiling point: 206° C. to 207° C., saturated vapor pressure: 0.063 kPa (25° C.)), 1,4-dimethoxybenzene (boiling point: 213° C., saturated vapor pressure: under 0.13 kPa (25° C.)) or diethylene glycol monobutyl ether (Butyl CARBITOL, boiling point: 230° C., saturated vapor pressure: 0.0013 kPa), are exemplified. Compounds that are not listed above are not particularly limited as long as the vapor pressure is 2,000 Pa or lower at 25° C. and the resin contained in the powder material for 3D modeling can dissolve by 1% by mass at 25° C. and the compound is selectable as appropriate according to the purpose. A single type of them may be used or at least two types of them may be used.

The content of the first organic solvent in the total hardener is preferably between 30% by mass and 90% by mass inclusive and is more preferably between 50% by mass and 80% by mass inclusive. When the content of the first organic solvent in the total hardener is preferably between 30% by mass and 90% by mass inclusive, it is possible to increase dissolvability of the resin and increase the strength of the 3D modeled object. Furthermore, it is possible to prevent the nozzle from drying when the apparatus is not in operation (standby) and inhibit solution clogging and gaps because of the nozzles.

Other Components

Other components are not particularly limited and other components are selectable as appropriate according to the purpose. For example, an anti-drying agent, a viscosity modifier, a surfactant, a penetrant, an antifoam, a pH adjuster, an antiseptic agent, an antifungal agent, a colorant, a preservative, and a stabilizer are exemplified. These known conventional materials can be added to the hardener without limitation.

Preparation of Hardener

A hardener was adjusted in a way that a polyisocyanate (D160N from Mitsui Chemicals, Inc.) made of a hexamethylene diisocyanate serving as a hardening agent and a diethyl succinate (from FUJIFILM Wako Pure Chemical Corporation) were mixed in per 100 pts together with the hardening agent such that the hardening agent was 23% by mass to the total hardener and the mixture was dispersed by 30 minutes with a homomixer.

Viscosity Measurement 1.1 mL of the hardener was sampled with a micropipette and viscosity measurement was performed with a viscometer TVE-25L from Toki Sangyo Co., Ltd. Measurement was started and the value of viscosity measured after 5 minute from the time when the value was stabilized served as the viscosity.

Surface Tension Measurement 30 mL of the hardener was sampled to a schale and surface tension measurement was performed with a surface tensiometer DY-300 from Kyowa Interface Science Co., Ltd. The surface tension that was measured by the Wilhelmy method using a platinum plate served as the surface tension.

Sintering Process

In a sintering process in the embodiment, a green body obtained by the modeling apparatus is heated in a debinding and sintering furnace at a temperature at which resin is decomposed by heat or higher, the resin components in the green body are debinded. Through a sintering step of heating and holding at a higher temperature following the above-described debinding step, it is possible to obtain a monolithic product of the green body (sintered body of the 3D modeled object).

The details of the debinding step are, for example, that the resin components consisting of an acrylic material are dissolved at a temperature higher than a temperature at which the resin components are decomposed and lower than a melting point of core particles or a solidus temperature. Depending on the resin components that are used, multiple temperatures for heating and holding can be set. Alternatively, a debinding technique by solvent extraction in which resin is extracted by immersing the green body in a solvent without heating is also applicable.

FIG. 8 is an illustration of a 3D modeled object and a sintered body of the 3D modeled object according to the embodiment.

FIG. 8 illustrates, at (a), a 3D modeled object 100 that is modeled by the modeling step illustrated in FIG. 7 and the 3D modeled object 100 includes a main body part 101 having a hollow part and a support part 102 whose both ends are attached to the inner circumferential surface of the hollow part of the main body part 101. The reference numeral 103 denotes the border between the main body part 101 and the support part 102. The border 103 corresponds to the positions of attachment of both ends of the support part 102 and is arranged in two positions that are opposed to each other.

FIG. 8 illustrates, at (b), a sintered body 100S of the 3D modeled object obtained by sintering the 3D modeled object 100 illustrated at (a) and (c) in FIG. 8 illustrates a sintered body 101S of the main body part obtained by removing a sintered body 102S of the support part from the sintered body 100S of the 3D modeled object illustrated at (b) in FIG. 8.

A reference numeral 103S denotes the borders between the sintered body 101S of the main body part and the sintered body 102S of the support part. According to (c) in FIG. 8, because the sintered body 102S of the support part is removed, the borders 103S turn to be surface parts 103s that are exposed at the surface of the sintered body 101S of the main body part. The sintered body 101S of the main body part is an example of the modeled body and the sintered body 102S of the support part is an example of the sacrificial body. The surface parts 103s correspond to the positions in which both ends of the sintered body 102S of the support part are removed and are arranged in two locations opposed to each other.

As illustrated at (a) in FIG. 8, the 3D modeled object 100 has the hollow part and has a risk that the 3D modeled object 100 would warp because of gravity when the 3D modeled object 100 shrinks thermally in the sintering step and thus deform. In the embodiment, the 3D modeled object 100 includes the support part 102, which makes it possible to inhibit deformation at the sintering step.

Figure 9B:
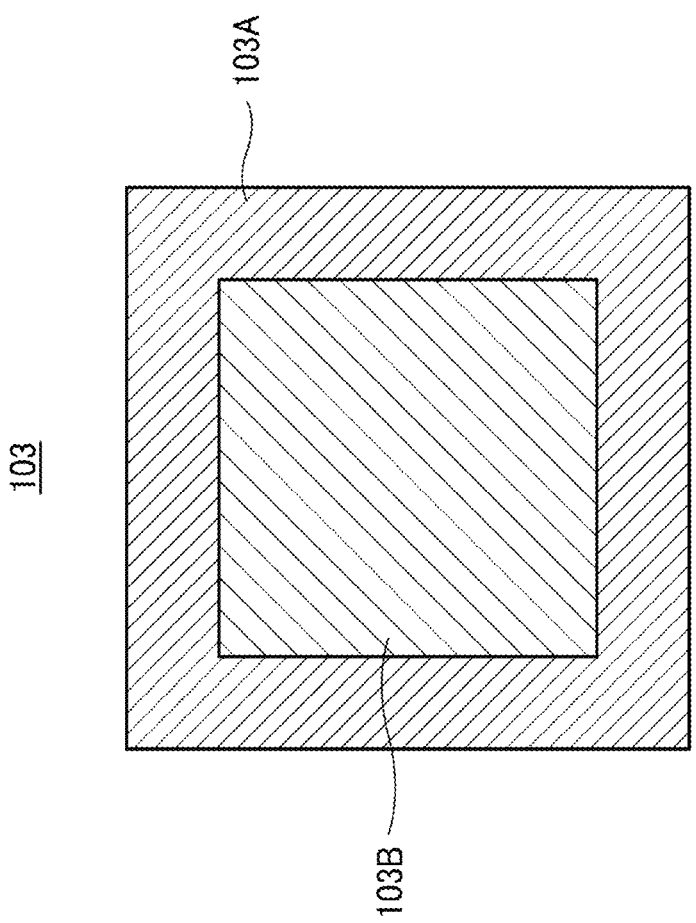
FIGS. 9A and 9B are illustrations of a border between a modeled body and a sacrificial body of the 3D modeled object.
Figure 9A:
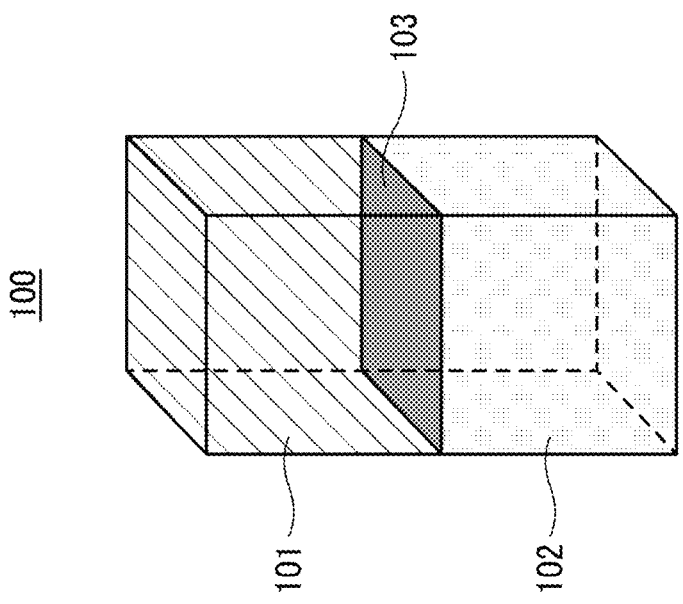

FIGS. 9A and 9B are illustrations of the border between the modeled body and the sacrificial body in the 3D modeled object.

The borders 103 between the main body part 101 and the support part 102 illustrated in FIG. 9A are formed such that the density of the powder 20 at the border 103 is smaller than the density of the powder 20 in the area of the main body part 101. Each of the powder 20 of the main body part 101, the powder 20 of the support part 102, and the powder 20 at the border 103 is applied with the modeling solution 10 and is hardened.

FIG. 9B is a cross-sectional view of the border 103 of the 3D modeled object 100 illustrated in FIG. 9A. As illustrated in FIG. 9B, the border 103 is formed such that the density of the powder 20 in a surface 103A of the border is smaller than the density of the powder 20 in an inner part 103B of the border. The density of the powder 20 in the inner part 103B of the border is equal to the density of the powder 20 in the main body part 101. Thus, the average density of the powder 20 over the border 103 is smaller than the density of the powder 20 in the main body part 101.

As described above, the 3D modeled object 100 is configured such that the density of the powder 20 at the border 103 is smaller than the density of the powder 20 in the main body part 101 and thus it is possible to easily remove the sintered body 102S of the support part from the sintered body 101S of the main body part from the border 103S serving as a starting point. This reduces a risk of fracture around the border 103S at removal of the sintered body 102S of the support part and thus increases accuracy of modeling the sintered body 101S of the main body part.

While the density of the powder 20 at the border 103 is smaller than the density of the powder 20 in the main body part 101, the powder 20 at the border 103 is applied with the modeling solution 10 and is hardened and thus, compared to the case where the modeling solution 10 is not applied to the powder 20 at the border 103, the strength of the border 103 increases and the risk that the 3D modeled object 100 would lose shape from the border 103 serving as a starting point reduces.

Furthermore, because the border 103 is formed such that the density of the powder 20 in the surface 103A of the border is smaller than the density of the powder 20 in the inner part 103B of the border, it is possible to, while ensuring a strength in the inner part 103B of the border where the density of the powder 20 is large, easily remove the sintered body 102S of the support part from the sintered body 101S of the main body part after sintering from the surface 103A of the border where the density of the powder 20 is small, which is the surface serving as a starting point. By changing the ratio of the areas of the surface 103A of the border and the inner part 103B of the border, it is possible to adjust the balance between ensuring of strength and removability of the sintered body 102S of the support part.

The sintered body 100S of the 3D modeled object will be described. In the modeling step, the powder 20 contains the base material and the dissolvable organic material (resin) and, because the dissolvable organic material is removed by the sintering step, after the sintering step, the 3D modeled object 100 configured such that the density of the powder 20 at the border 103 is smaller than the density of the powder 20 in the main body part 101 turns to be the sintered body 100S of the 3D modeled object configured such that the density of the base material at the border 103S is smaller than the density of the base material in the sintered body 101S of the main body part.

In the state illustrated at (c) in FIG. 8, because the border 103S turns to be the surface part 103s that is exposed at the inner circumferential surface of the hollow part of the sintered body 101S of the main body part, the sintered body 101S of the main body part is configured such that the density of the base material in the surface part 103s is smaller than the density of the inner part of the base material.

Subsequently, the modeling step necessary to obtain the above-described sintered body 101S of the main body part will be described.

In the modeling step illustrated in FIG. 7, the modeling solution 10 is applied to the area of the modeled layer 30 corresponding to the main body part 101 and the sintered body 101S of the main body part and the area of the modeled layer 30 corresponding to border 103 and the border 103S such that the density of the powder 20 in the area of the modeled layer 30 corresponding to the border 103 and the border 103S is smaller than the density of the powder 20 in the area of the modeled layer 30 corresponding to the main body part 101 and the sintered body 101S of the main body part.

Accordingly, it is possible to obtain the 3D modeled object 100 that is configured such that the density of the powder 20 at the border 103 is smaller than the density of the powder 20 in the main body part 101 and, after the sintering step, easily remove the sintered body 102S of the support part from the sintered body 101S of the main body part from the border 103S serving as a starting point.

In the modeling step, because the modeling solution 10 is applied to the area of the modeled layer 30 corresponding to the border 103 and the border 103S, compared to the case where the modeling solution 10 is not applied to the area of the modeled layer 30 corresponding to the border 103 and the border 103S, the strength of the border 103 increases and the risk that the 3D modeled object 100 would lose shape from the border 103 serving as a starting point is reduced.

In the modeling step, the modeling solution 10 is applied to the surface and the inner part of the area of the modeled layer 30 corresponding to the border 103 and the border 103S such that the density of the powder 20 in the surface of the area of the modeled layer 30 corresponding to the border 103 and the border 103S is smaller than the density of the powder 20 in the inner part of the area of the modeled layer 30 corresponding to the border 103 and the border 103S.

Accordingly, because of the surface 103A of the border where the density of the powder 20 is small, it is possible to, while ensuring the strength in the inner part 103B of the border where the density of the powder 20 is large, after sintering, easily remove the sintered body 102S of the support part from the sintered body 101S of the main body part.

Furthermore, in the modeling step, the same modeling solution 10 is applied to the area of the modeled layer 30 corresponding to the main body part 101 and the sintered body 101S of the main body part and the area of the modeled layer 30 corresponding to the border 103 and the border 103S.

Accordingly, compared to the case where different modeling solutions are applied, fracture due to difference in thermal contraction at sintering that would result from different solutions decreases and productivity increases. Similarly, in the modeling step, it is preferable that the same modeling solution 10 be applied to the area of the modeled layer 30 corresponding to the support part 102 and the sintered body 102S of the support part and the area of the modeled layer 30 corresponding to the border 103 and the border 103S.

The aspect that the relationship between the application amount of the modeling solution 10 and the density of the powder 20 varies because of the fluidity of the material of the powder 20 will be described.

In the case where powder with a low specific gravity and high fluidity, such as aluminum, is used, the powder scatters when the modeling solution impacts a power bed and the void in the 3D modeled object 100 increases. For example, Document (N. D Parab, et al., "Real time observation of binder jetting printing process using high-speed X-ray imaging", Sci. Rep., 9 (1) (2019), p. 2499.) has reported a difference in powder scattering at the impact of the solution fluid depending on the powder type (material: SUS316, silicon carbide, aluminum oxide, silicon, particle diameter: 9 to 32 um) by an observation technique using X-rays and a high-speed camera.

For example, in association with results, it is reported that, while SUS powder of an average grain diameter of 9 μm does not scatter when the modeling solution impacts, SUS powder of an average grain diameter of 30 μm scatters with the impact of the modeling solution. It is considered that the powder fluidity based on the powder diameter and the powder form has effect on the difference in powder scattering.

In other words, for comparison between SUS powders, it is considered that the difference results from the fact that the fluidity decreases as the powder diameter reduces and scattering of powder between other materials is based on a similar mechanism.

The phenomenon described above depends largely on the fluidity and specific gravity of powder. Powder with low fluidity and a high specific gravity like that of SUS or copper tends not to scatter when the modeling solution impacts the powder bed. With an increase in the amount of the modeling solution, such powder coagulates by solution cross-linkage when the powder bed is immersed with the solution fluid and the density of the 3D modeled object increases and therefore reducing the modeling solution to the border layer is preferable order to reduce the density at sintering.

In the embodiment, in the case where the powder 20 is a material, such as SUS or copper powder, whose fluidity is lower than that of aluminum powder, in the modeling step, the modeling solution 10 is applied such that the application amount of the modeling solution 10 to the unit area of the area of the modeled layer 30 corresponding to the border 103 and the border 103S is smaller than the application amount of the modeling solution 10 to the unit area of the area of the modeled layer 30 corresponding to the main body part 101 and the sintered body 101S of the main body part.

On the other hand, in the case of a material, such as aluminum powder, with a fluidity higher than that of SUS powder, in the modeling step, the modeling solution is applied such that the application amount of the modeling solution 10 to the unit area of the area of the modeled layer 30 corresponding to the border 103 and the border 103S is larger than the application amount of the modeling solution 10 to the unit area of the area of the modeled layer 30 corresponding to the main body part 101 and the sintered body 101S of the main body part.

In this manner, regardless of the fluidity of the powder 20, it is possible to obtain the 3D modeled object 100 that is configured such that the density of the powder 20 at the border 103 is smaller than the density of the powder 20 in the main body part 101.

Figure 10B:
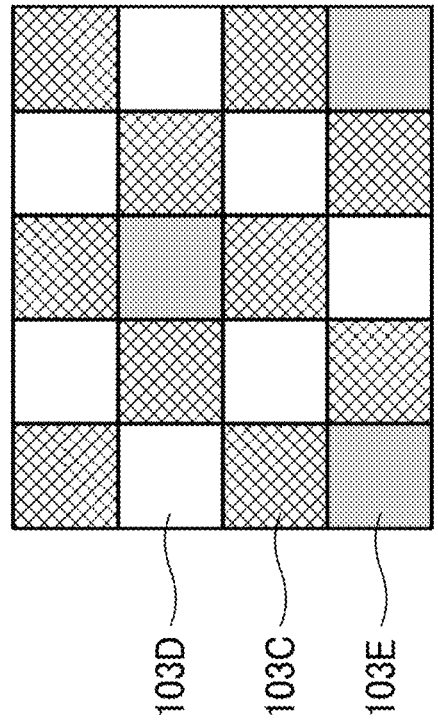
FIGS. 10A and 10B is a detailed illustration of the border between the modeled body and the sacrificial body of the 3D modeled object according to the embodiment.
Figure 10A:
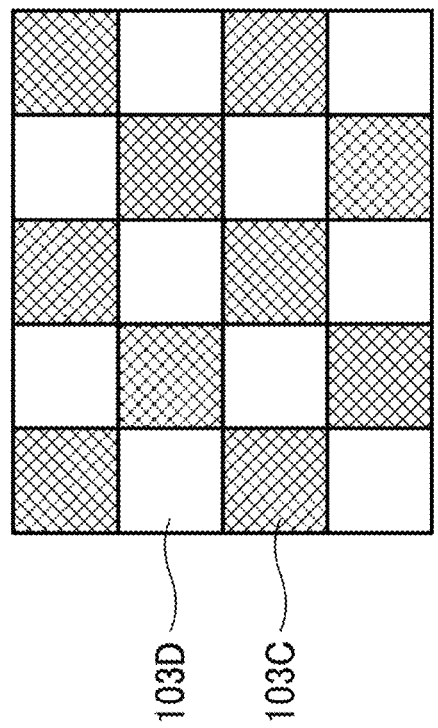

FIGS. 10A and 10B are detailed illustrations of the border between the modeled body and the sacrificial body in the 3D modeled object according to the embodiment.

FIG. 10A is an example of a cross-sectional view of the border 103 of the 3D modeled object 100. The border 103 is latticed such that parts 103C where the density of the powder 20 is high and parts 103D where the density of the powder 20 is low are alternate.

Specifically, each of the parts 103C where the density of the powder 20 is high is surrounded by the parts 103C where the density of the powder 20 is high and the parts 103D where the density of the powder 20 is low and each of the parts 103D where the density of the powder 20 is low is surrounded by the parts 103C where the density of the powder 20 is high and the parts 103D where the density of the powder 20 is low.

FIG. 10B is another example of the cross-sectional view of the border 103 of the 3D modeled object 100. The border 103 is latticed such that the parts 103C where the density of the powder 20 is high and the parts 103D where the density of the powder 20 is low or parts 103E where the density of the powder 20 is intermediate are alternate.

Specifically, each of the parts 103C where the density of the powder 20 is high is surrounded by the parts 103C where the density of the powder 20 is high, the parts 103D where the density of the powder 20 is low, and the parts 103E where the density of the powder 20 is intermediate and each of the parts 103D where the density of the powder 20 is low is surrounded by the parts 103C where which the density of the powder 20 is high, the parts 103D where the density of the powder 20 is low, and the parts 103E where the density of the powder 20 is intermediate.

The sintered body 100S of the 3D modeled object will be described next. In the modeling step, the powder 20 contains the base material and the dissolvable organic material (resin) and, because the dissolvable organic material is removed by the sintering step, the 3D modeled object 100 containing the parts 103C where the density of the powder 20 is high, the parts 103D where the density of the powder 20 is low, and the part 103E where the density of the powder 20 is intermediate turns to be, after the sintering step, the sintered body 100S of the 3D modeled object containing, at the border 103S, the part where the density of the base material is high, the part where the density of the base material is low, and the part where the density of the base material is intermediate.

Accordingly, the difference in shrinkage factor among the parts where the density of the base material is high, the parts where the density of the base material is small and the parts where the density of the base material is intermediate causes an internal stress in the area with a low shrinkage factor and more significantly causes micro fissures and, after sintering, it is possible to easily remove the sintered body 102S of the support part from the sintered body 101S of the main body part.

In the state illustrated at (c) in FIG. 8, because the border 103 turns to be the surface part 103s that is exposed at the inner circumferential surface of the hollow part of the sintered body 101S of the main body part, in the sintered body 101S of the main body part, the parts where the density of the base material is high, the parts where the density of the base material is low or the parts where the density of the base material is intermediate are arranged alternately.

Subsequently, the modeling step necessary to obtain the sintered body 101S of the main body part will be described.

In the modeling step illustrated in FIG. 7, the modeling solution 10 is applied to the area of the modeled layer 30 corresponding to the border 103 and the border 103S such that the part C where the density of the powder 20 is high, the part where the density of the powder 20 is low or the part where the density of the powder 20 is intermediate are alternate and latticed in the area of the modeled layer 30 corresponding to the border 103 and the border 103S.

Accordingly, as illustrated in FIGS. 10A and 10B, the border 103 of the 3D modeled object 100 is latticed such that the parts 103C where the density of the powder 20 is high and the parts 103D where the density of the powder 20 is low or the parts 103E where the density of the powder 20 is intermediate are alternate.

Summary

As described above, a method of manufacturing a modeled body according to the embodiment of the disclosure includes a modeling step of forming the modeled layer 30 by applying the modeling solution 10 to each layer of the powder 20 that is laid in a layer and solidifying the powder 20 to which the modeling solution 10 is applied and modeling the 3D modeled object 100 that is an example of a solidified object by sequentially stacking the modeled layers 30; a sintering step of obtaining the sintered body 100S of the 3D modeled object by sintering the 3D modeled object 100 that is modeled by the modeling step; and a removing step of, by removing the sintered body 102S of a support part that is an example of a sacrificial body from the sintered body 100S of the 3D modeled object, obtaining the sintered body 101S of a main body part that is an example of a modeled body obtained by removing the sintered body 102S of the support part from the sintered body 100S of the 3D modeled object, wherein the modeling step includes applying the modeling solution 10 to a modeled body area and a border area such that, after the modeling solution 10 is applied, a density of the powder 20 in the border area in the 3D modeled object 100 and the modeled layer 30 corresponding to the border 103 between the main body part 101 and the support part 102 is smaller than a density of the powder 20 in the modeled body area in the 3D modeled object 100 and the modeled layer 30 corresponding to the main body part 101.

Accordingly, it is possible to obtain the 3D modeled object 100 configured such that the density of the powder 20 at the border 103 is smaller than the density of the powder 20 in the main body part 101 and, after the sintering step, easily remove the sintered body 102S of the support part from the sintered body 101S of the main body part from the border 103S between the sintered body 101S of the main body part and the sintered body 102S of the support part, which is the border serving as a starting point. This reduces the risk of fracture around the border 103S at removal of the sintered body 102S of the support part.

In the modeling step, because the modeling solution 10 is applied to the border area, compared to the case where the modeling solution 10 is not applied to the border area, the strength of the border 103 increases and the risk that the 3D modeled object 100 would lose shape from the border 103 serving as a starting point reduces.

In other words, before sintering, the risk that the 3D modeled object 100 would lose shape is reduced and, after sintering, the risk of fracture around the border 103S at removal of the sintered body 102S of the support part decreases, which increases accuracy of modeling the sintered body 101S of the main body part that is obtained eventually.

The density of the powder 20 over the border 103 need not necessarily be smaller than the density of the powder 20 in the main body part 101, and the density of the powder 20 in part of the border 103 may be equal to the density of the powder 20 in the main body part 101.

In the modeling step, the same modeling solution 10 is applied to the modeled body area and the border area.

Accordingly, compared to the case where different modeling solutions are applied, fracture due to a difference in thermal contraction at sintering that would result from different solutions decreases and productivity increases. Similarly, in the modeling step, it is preferable that the same modeling solution 10 be applied to the support area and the border area in the 3D modeled object 100 and the modeled layer 30 corresponding to the support part 102.

In the modeling step, the modeling solution 10 is applied to the surface and the inner part of the border area such that, after the modeling solution 10 is applied, the density of the powder 20 in the surface of the border area is smaller than the density of the powder 20 in the inner part of the border area.

Accordingly, it is possible to, while ensuring a strength in the inner part 103B of the border where the density of the powder 20 is large, easily remove the sintered body 102S of the support part from the sintered body 101S of the main body part after sintering from the surface 103A of the border where the density of the powder 20 is small, which is the surface serving as a starting point. By changing the ratio of the areas of the surface 103A of the border and the inner part 103B of the border, it is possible to adjust the balance between ensuring of strength and removability of the sintered body 102S of the support part.

The powder 20 is a material, such as SUS or copper powder, whose fluidity is lower than that of aluminum powder and, in the modeling step, the modeling solution 10 is applied such that the application amount of the modeling solution 10 to the unit area of the border area is smaller than the application amount of the modeling solution 10 to the unit area of the area of the modeled body area.

Alternatively, the powder 20 is a material, such as aluminum powder, with a fluidity higher than that of SUS powder and, in the modeling step, the modeling solution 10 is applied such that the application amount of the modeling solution 10 to the unit area of the border area is larger than the application amount of the modeling solution 10 to the unit area of the modeled body area.

Thus, regardless of the fluidity of the powder 20, it is possible to obtain the 3D modeled object 100 that is configured such that the density of the powder 20 at the border 103 is smaller than the density of the powder 20 in the main body part 101.

In the modeling step, the modeling solution 10 is applied such that, after the modeling solution 10 is applied, the areas in which the density of the powder 20 is large and the areas in which the density of the powder 20 is small are alternate. Furthermore, in the modeling step, the modeling solution 10 is applied such that, after the modeling solution 10 is applied, the areas in which the density of the powder 20 is large and the areas in which the density of the powder 20 is small are latticed.

Accordingly, at the sintering step, the difference in shrinkage factor among the parts in different densities causes an internal stress in the area with a low shrinkage factor and more significantly causes micro fissures and, after sintering, it is possible to easily remove the sintered body 102S of the support part from the sintered body 101S of the main body part.

A method of modeling a solidified object according to the embodiment of the disclosure is a method of modeling a solidified object that is used for the method of manufacturing a modeled body and that includes a sintering step of obtaining the sintered body 100S of a 3D modeled object 100 that is an example of the solidified object by sintering the 3D modeled object 100 and a removing step of, by removing the sintered body 102S of the support part from the sintered body 100S of the 3D modeled object, obtaining the sintered body 101S of a main body part that is an example of a modeled body obtained by removing the sintered body 102S of the support part that is an example of a sacrificial body from the sintered body 100S of the 3D modeled object, wherein the method includes a modeling step of forming the modeled layer 30 by applying the modeling solution 10 to each layer of the powder 20 that is laid in a layer and solidifying the powder 20 to which the modeling solution 10 is applied and modeling the 3D modeled object 100 by sequentially stacking the modeled layers 30, wherein the modeling step includes applying the modeling solution 10 to a modeled body area and a border area such that, after the modeling solution 10 is applied, a density of the powder 20 in the border area in the 3D modeled object 100 and the modeled layer 30 corresponding to the border 103 between the main body part 101 and the support part 102 is smaller than a density of the powder 20 in the modeled body area in the 3D modeled object 100 and the modeled layer 30 corresponding to the main body part 101.

The sintered body 101S of the main body part that is an example of the modeled body obtained by sintering the main body part 101 that is an example of the solidified object containing the base material according to the embodiment of the disclosure contains the surface part 103s where the density of the base material is smaller than the density of the inner part of the base material.

The sintered body 101S of the main body part is obtained by removing the sintered body 102S of the support part from the sintered body 101S of the main body part from the border 103S serving as a starting point and the surface part 103s results from exposure of the border 103S.

The density of the base material in the surface part 103s, that is, the border 103S is smaller than the density of the base material in the sintered body 101S of the main body part and thus the sintered body 102S of the support part is easily removed from the sintered body 101S of the main body part from the border 103S serving as a starting point and the risk of fracture around the border 103 is small at the removal of the sintered body 102S of the support part and thus the sintered body 101S modeled accurately is obtained.

The sintered body 101S has the hollow part and the inner circumferential surface of the hollow part contains, in two locations opposed to each other, the surface parts 103s where the density of the base material is smaller than the density of the inner part of the base material.

The sintered body 101S of the main body part is obtained by removing both ends of the sintered body 102S of the support part from the sintered body 101S of the main body part from the borders 103S in two locations serving as a starting point and the surface parts 103s in the two locations opposed to each other results from exposure of the borders 103S in the two locations opposed to each other.

In other words, because, at sintering, the hollow part of the sintered body 101S is supported on both ends of the sintered body 102S of the support part, the risk of deformation because of flexes due to gravity at thermal shrinkage is small and thus the sintered body 101S modeled accurately is obtained.

In the surface part 103s, the areas where the density of the base material is large and the areas where the density of the base material is small are arranged alternately.

The sintered body 101S of the main body part is obtained by removing the sintered body 102S of the support part from the sintered body 101S of the main body part from the border 103S serving as a starting point and the surface part 103s results from exposure of the border 103S.

At the border 103S, because the areas where the density of the base material is large and the areas where the density of the base material is small are arranged alternately, at the sintering step, the difference in shrinkage factor among the parts with different densities causes an internal stress in the area with a low shrinkage factor and more significantly causes micro fissures and, after sintering, it is possible to easily remove the sintered body 102S of the support part from the sintered body 101S of the main body part.

In other words, because the sintered body 102S of the support part is removed easily from the sintered body 101S of the main body part from the border 103S serving as a starting point and the risk of fracture around the border 103S is small when the sintered body 102S of the support part is removed, the sintered body 101S modeled accurately is obtained.

According to an embodiment, it is possible to provide a modeled body with high modeling accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A method of manufacturing a modeled body comprising:
    modeling including applying a modeling solution to each layer of powder laid in a layer, to solidify the powder to which the modeling solution is applied, to model a solidified object;
    sintering the solidified object modeled at the modeling to obtain a sintered body of the solidified object; and
    removing a sacrificial body from the sintered body, to obtain a modeled body in which the sacrificial body is removed from the sintered body,
    wherein at the modeling, the modeling solution is applied to a modeled body area in the solidified object and a border area in the solidified object such that, after the modeling solution is applied, a density of the powder at the border area is smaller than a density of the powder in the modeled body area, the modeled body area corresponding to the modeled body, the border area corresponding to a border between the modeled body and the sacrificial body,
    the powder is a material having fluidity lower than fluidity of aluminum powder, and
    at the modeling, the modeling solution is applied such that an application amount of the modeling solution to a unit area of the border area is smaller than an application amount of the modeling solution to a unit area of the modeled body area.

2. The method of manufacturing the modeled body according to claim 1, wherein at the modeling, an identical modeling solution is applied to the modeled body area and the border area.

3. The method of manufacturing the modeled body according to claim 1, wherein at the modeling, the modeling solution is applied to a surface of the border area and an inner part of the border area such that, after the modeling solution is applied, a density of the powder in the surface of the border area is smaller than a density of the powder in the inner part.

4. The method of manufacturing the modeled body according to claim 1, wherein at the modeling, the modeling solution is applied such that, after the modeling solution is applied, areas where a density of the powder is larger and areas where a density of the powder is smaller are alternate in the border area.

5. The method of manufacturing the modeled body according to claim 4, wherein at the modeling, the modeling solution is applied such that, after the modeling solution is applied, the areas where the density of the powder is larger and the areas where the density of the powder is smaller are latticed.

6. A method of modeling a solidified object that is used for a method of manufacturing a modeled body including:
    sintering a solidified object to obtain a sintered body; and
    removing a sacrificial body from the sintered body, to obtain a solidified object in which the sacrificial body is removed from the sintered body,
    the method of modeling a solidified object comprising:
    applying a modeling solution to each layer of powder laid in a layer and solidifying the powder to which the modeling solution is applied, to model the solidified object,
    wherein at the modeling the modeling solution is applied to a modeled body area in the solidified object and a border area in the solidified object such that, after the modeling solution is applied, a density of the powder in the border area is smaller than a density of the powder in the modeled body area, the modeled body area corresponding to the modeled body, the border area corresponding to a border between the modeled body and the sacrificial body,
    the powder is a material having fluidity lower than fluidity of aluminum powder, and
    at the modeling, the modeling solution is applied such that an application amount of the modeling solution to a unit area of the border area is smaller than an application amount of the modeling solution to a unit area of the modeled body area.

* * * * *